US012549881B2

(12) United States Patent
Wang

(10) Patent No.: US 12,549,881 B2
(45) Date of Patent: Feb. 10, 2026

(54) AUDIO PLAYING METHOD, APPARATUS AND SYSTEM FOR IN-EAR EARPHONE

(71) Applicant: GOERTEK INC., Shandong (CN)

(72) Inventor: Zhongzhen Wang, Shandong (CN)

(73) Assignee: GOERTEK INC., Weifang (CN)

( * ) Notice: Subject to any disclaimer, the term of this patent is extended or adjusted under 35 U.S.C. 154(b) by 293 days.

(21) Appl. No.: 18/259,796

(22) PCT Filed: Jun. 30, 2021

(86) PCT No.: PCT/CN2021/103649

§ 371 (c)(1),
(2) Date: Jun. 29, 2023

(87) PCT Pub. No.: WO2022/142224

PCT Pub. Date: Jul. 7, 2022

(65) Prior Publication Data

US 2024/0073577 A1 Feb. 29, 2024

(30) Foreign Application Priority Data

Dec. 29, 2020 (CN) ......................... 202011600763.1

(51) Int. Cl.
*H04R 1/10* (2006.01)
*G10L 25/78* (2013.01)
*H04R 3/00* (2006.01)

(52) U.S. Cl.
CPC ............. *H04R 1/1016* (2013.01); *H04R 3/00* (2013.01); *G10L 25/78* (2013.01)

(58) Field of Classification Search
CPC .......... H04R 1/1016; H04R 3/00; G10L 25/78
(Continued)

(56) References Cited

U.S. PATENT DOCUMENTS 10,972,834 B1 * 4/2021 Yen ......................... G10L 25/78
2015/0170645 A1 * 6/2015 Di Censo ......... G10K 11/17821 704/275
2019/0304432 A1 10/2019 Yan

FOREIGN PATENT DOCUMENTS

CN 104469587 A 3/2015
CN 105814913 A 7/2016
(Continued)

OTHER PUBLICATIONS

International Search Report from International Application No. PCT/CN2021/103649 mailed Sep. 28, 2021.

*Primary Examiner* — Vivian C Chin
*Assistant Examiner* — Con P Tran
(74) *Attorney, Agent, or Firm* — Shih IP Law Group, PLLC

(57) ABSTRACT

Disclosed are audio playing method, apparatus, and system for in-ear earphone, applied to in-ear earphone provided with a vibration sensor, including following steps: when the earphone is in audio playing mode, controlling the earphone to perform audio playing according to a current audio file; acquiring a vibration signal in user's ear canal by the vibration sensor during audio playing; acquiring corresponding voice parameter according to the vibration signal, and determining whether the user is communicating with another person according to the voice parameter; if so, switching the earphone to auxiliary listening mode, wherein the auxiliary listening mode is configured to collect ambient sound and play a first sound signal in the ambient sound by the earphone, and the first sound signal includes a sound signal of the person communicating with the user; and if not, continuing maintaining the current audio playing mode.

7 Claims, 2 Drawing Sheets

(58) Field of Classification Search
USPC ...................... 381/74, 56, 58, 122, 123, 380
See application file for complete search history.

(56) References Cited

FOREIGN PATENT DOCUMENTS

| | | | |
|---|---|---|---|
| CN | 107995547 | A | 5/2018 |
| CN | 108391206 | A | 8/2018 |
| CN | 109348338 | A | 2/2019 |
| CN | 110113688 | A | 8/2019 |
| CN | 110602594 | A | 12/2019 |
| CN | 111464905 | A | 7/2020 |
| CN | 210927936 | U | 7/2020 |
| CN | 112822585 | A | 5/2021 |
| EP | 3547710 | A1 | 10/2019 |

* cited by examiner

AUDIO PLAYING METHOD, APPARATUS AND SYSTEM FOR IN-EAR EARPHONE

The present disclosure claims a priority to a Chinese Patent Application No. 202011600763.1, titled "audio playing method, apparatus and system for in-ear earphone" filed in China Patent Office on Dec. 29, 2020, the entire contents of which are incorporated herein by reference.

TECHNICAL FIELD

The present disclosure relates to a technical field of earphone, and in particular to an audio playing method, an audio playing apparatus and an audio playing system for in-ear earphone.

BACKGROUND

With the development of mobile communication, various intelligent wearable devices are becoming increasingly widely used in people's lives, among which wireless earphones have become a necessary object in public life. Wireless earphones are used to listen to music, audio and video, and perform phone calls, and provides great convenience to people compared to wired earphones. However, if users need to communicate with others in person during usages, they need to manually turn off the audio and remove the earphones, otherwise it will seriously affect the communication effect with others, and removing the earphones can easily lead to the loss of the earphones, or users need to manually reduce the volume so that the speaking of other person can be clearly heard, however these methods all provide inconvenience to users and affect the user's using experience.

In view of this, how to provide an audio playing method, apparatus, and system for in-ear earphone to solve the above technical problems has become a technical problem that those skilled in the art need to solve.

SUMMARY

The purpose of the embodiment of the present disclosure is to provide an audio playing method, apparatus, and system for in-ear earphone (such as, headsets, earphones, headphones, earbuds, earpods, etc.), which can provide convenience to users during usage and improve the user's using experience.

In order to solve the above technical problems, the embodiment of the present disclosure provides an audio playing method for in-ear earphone, which is applied to in-ear earphone provided with vibration sensor, including:

when the earphone is in audio playing mode, controlling the earphone to perform audio playing according to a current audio file;

acquiring vibration signal in user's ear canal by the vibration sensor during the audio playing;

acquiring corresponding voice parameter according to the vibration signal, and determining whether the user is communicating with another person according to the voice parameter; if so, switching the earphone to auxiliary listening mode, wherein the auxiliary listening mode is configured to collect ambient sound and play a first sound signal in the ambient sound by the earphone, and the first sound signal comprises a sound signal of the person communicating with the user; if not, continuing maintaining the current audio playing mode.

Optionally, if the voice parameter includes voice energy, acquiring the corresponding voice parameter according to the vibration signal, and determining whether the user is communicating with another person according to the voice parameter includes:

acquiring the corresponding voice energy according to the vibration signal, and determining whether the value of the corresponding voice energy reaches a preset value according to the voice energy; if so, determining that the user is communicating with another person; if not, determining that the user is not communicating with another person.

Optionally, acquiring the corresponding voice energy according to the vibration signal, and determining whether the value of the corresponding voice energy reaches a preset value according to the voice energy includes:

performing noise elimination processing on the vibration signal to extract a first vibration signal corresponding to the user's voice;

performing voice energy detection on the first vibration signal to obtain the value of the corresponding voice energy, and determining whether the value of the corresponding voice energy reaches the preset value.

Optionally, before the performing voice energy detection on the first vibration signal to obtain the value of the corresponding voice energy, and determining whether the value of the corresponding voice energy reaches the preset value, the audio playing method further includes:

transmitting the first vibration signal to a terminal device so as to recognize identity of the user; and receiving recognition result and proceed to the next step when the recognition result is verified.

Optionally, the first sound signal comprises a human sound signal and/or an anthropomorphic sound signal.

Optionally, collecting ambient sound and playing a first sound signal in the ambient sound by the earphone includes:

collecting ambient sound and performing noise elimination processing on the ambient sound to obtain the sound signal corresponding to the human's voice in the ambient sound;

mixing the first sound signal with the audio signal currently playing to obtain a mixed sound signal, and playing the mixed sound signal by the earphone.

Optionally, before the mixing the first sound signal with the audio signal currently playing to obtain a mixed sound signal, the audio playing method further includes: performing loudness compensation processing on the first sound signal to obtain the compensated sound signal;

picking up sound signal in the user's ear canal and extracting resonant sound signal from the sound signal in the user's ear canal; and processing the resonant sound signal to obtain a resonant sound suppression signal;

then, mixing the sound signal corresponding to the human's voice with the audio signal currently playing to obtain a mixed sound signal includes:

mixing the compensated sound signal and the resonance sound suppression signal with the audio signal currently playing to obtain a mixed sound signal.

Optionally, after the switching the earphone to auxiliary listening mode, the audio playing method further includes:

continuing to collect vibration signal in the user's ear canal by the vibration sensor, and when it is determined that the user is not communicating with another person according to the vibration signal, switching the earphone to the audio playing mode so that the earphone continues playing the audio file currently playing.

The embodiment of the present disclosure further provides an audio playing apparatus for in-ear earphone, which is applied to in-ear earphone provided with vibration sensor, including:

a playing module for controlling the earphone to perform audio playing according to a current audio file when the earphone is in an audio playing mode;

an acquisition module for acquiring vibration signal in user's ear canal by the vibration sensor during the audio playing;

a determination module for acquiring corresponding voice parameter according to the vibration signal, and determining whether the user is communicating with another person according to the voice parameter; if so, activating the control module; if not, activating the playing module; and a control module for switching the earphone to an auxiliary listening mode, wherein the auxiliary listening mode is configured to collect ambient sound and play a first sound signal in the ambient sound by the earphone, and the first sound signal includes a sound signal of the person communicating with the user.

The embodiment of the present disclosure also provides an audio playing system for in-ear earphone, including a processor, a memory, and a vibration sensor for collecting vibration signal in user's ear canal provided on the in-ear earphone, wherein, the memory is configured to store a computer program;

the processor is configured to implement the steps of the audio playing method for in-ear earphone as described above when executing the computer program.

The embodiment of the present disclosure provides an audio playing method, apparatus, and system for in-ear earphone, and a computer-readable storage medium, which are applied to an in-ear earphone provided with a vibration sensor. The audio playing method can perform audio playing of the current audio file when the earphone is in the audio playing mode, and collect vibration signal in the user's ear canal by the vibration sensor provided on the earphone during the process of audio playing, and then acquire the corresponding voice parameter according to the vibration signal, and determine whether the user is communicating with another person according to the voice parameter. If the user is communicating with another person, it indicates that the user needs to communicate with another person in person, and therefore, at this point, the earphone is switched to auxiliary listening mode, wherein the auxiliary listening mode is configured to collect ambient sound and play a first sound signal in the ambient sound by the earphone, wherein the first sound signal includes the sound signal of the person communicating with the user. The present disclosure can provide convenience for users and improve the user's using experience.

BRIEF DESCRIPTION OF DRAWINGS

In order to illustrate the technical solutions in the embodiments of the present disclosure or the prior art more clearly, the drawings required to be used in the content of the embodiments or the prior art will be introduced briefly as following. Obviously, the drawings described in the following are merely a part of the drawings of the present disclosure, and for those of ordinary skill in the art, other drawings may also be obtained according to the provided drawings without any creative labor.

DETAILED DESCRIPTIONS

The embodiment of the present disclosure provides an audio playing method, apparatus, and system for in-ear earphone, and a computer-readable storage medium, which can provide convenience to users during usage and improve the user's using experience.

In order to make the purpose, technical solution, and advantages of the embodiments of the present disclosure clearer, the following will provide a clear and complete descriptions of the technical solution in the embodiments of the present disclosure in conjunction with the accompanying drawings. Obviously, the described embodiments are a part of the embodiments of the present disclosure, not all of the embodiments. Based on the embodiments in the present disclosure, all other embodiments obtained by those skilled in the art without creative labor fall within the protection scope of the present disclosure.

Figure 1:
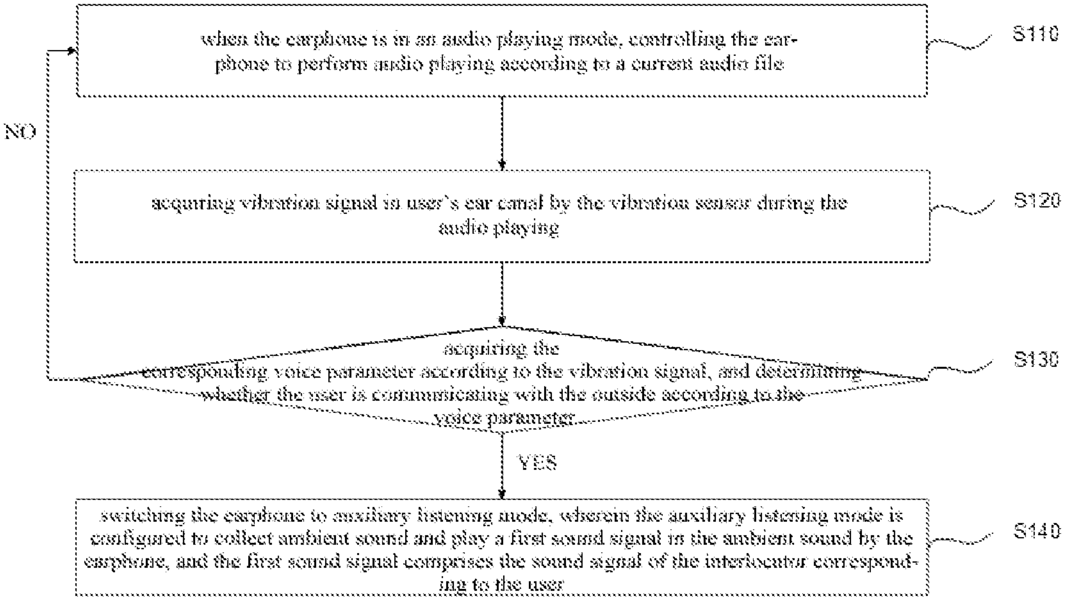
FIG. 1 is a schematic flowchart of an audio playing method for an in-ear earphone according to an embodiment of the present disclosure.

Refer to FIG. 1, FIG. 1 is a schematic flowchart of an audio playing method for an in-ear earphone provided by an embodiment of the present disclosure. This audio playing method is applied to the in-ear earphone provided with a vibration sensor, the method including:

S110: when the earphone is in an audio playing mode, controlling the earphone to perform audio playing according to a current audio file;

specifically, when the earphone is in the audio playing mode, controlling the earphone to playing the corresponding audio according to the audio file currently playing. Here, the present disclosure can be specifically applied to TWS earphone. For TWS earphone, when the earphone is in the audio playing mode, the Bluetooth protocol stack inside the TWS earphone outputs encoded audio data according to the current audio file, decodes the Bluetooth audio to obtain PCM format audio data, performs sound effect post-processing on the audio data to obtain the rendered audio, and generates the corresponding sound signal through the earphone, and specifically, the sound signal can be generated through the loudspeaker in the ear canal provided on the earphone. Of course, in practical applications, it is also possible to perform noise suppression processing after obtaining rendered audio, and obtain audio data superimposed with inverted noise, and then generate the sound signal by the loudspeakers in the ear canal provided on the earphone, wherein the noise may include ambient noise and ear canal internal noise. Here, the ambient noise may be obtained through an ear canal external microphone, and the ear canal internal noise may be picked up through the ear canal internal microphone, and the specific acquiring method and noise elimination method are not especially limited in this embodiment.

S120: acquiring vibration signal in user's ear canal by the vibration sensor during the audio playing;

It should be noted that the vibration sensor is provided on the earphone in advance, wherein the vibration sensor can be provided inside the sound chamber of the in-ear earphone, and the contact point of the vibration sensor may be provided at a position of the outer wall of the sound chamber abutting against the user's ear canal. That is, after the user wears the earphones, the contact point of the vibration sensor on the earphones may be abutted against the user's ear canals, and therefore, the vibration signal in the user's ear canals can be transmitted to the vibration sensors, wherein the vibration signal caused by the user speaking includes the ear canal vibration signal caused by the user speaking and the ear canal vibration signal caused by ambient sound. In practical applications, vibration signal in the user's ear canal can be collected in real-time by vibration sensors during the process of music playing.

S130: acquiring the corresponding voice parameter according to the vibration signal, and determining whether the user is communicating with another person according to the voice parameter, if so, the process proceeds to S140; and if not, the process returns to S110 to continue maintaining the current audio playing mode.

Specifically, after acquiring the vibration signal, it is possible to extract the vibration signal corresponding to the user's voice from the vibration signal, and then acquire the corresponding voice parameter according to the vibration signal, followed by determining whether the user is communicating with another person according to the voice parameter. When the user is communicating with another person in person, the process proceeds to S140; When the users do not have the need for communication with another person in person, it continue maintaining the current audio playing mode to play the current audio file.

S140: switching the earphone to an auxiliary listening mode, wherein the auxiliary listening mode is configured to collect ambient sound and play, by the earphone, a first sound signal in the ambient sound, wherein the first sound signal comprises the sound signal of the person communicating with the user.

It can be understood that, when it is determined that the user's voice energy value is greater than a preset value, that is, when it is determined the user is communicating with another person in person, in order to ensure that the user can clearly hear the voices of external personnel without removing the earphones, the earphones can be switched to auxiliary listening mode to collect ambient sound in the auxiliary listening mode. Specifically, the ambient sound can be collected by ear canal external microphone provided on the earphone, wherein the ambient sound includes ambient noise and human voice. This embodiment can extract sound signal corresponding to the human voice in the ambient sound and play it by the earphone, so that the user can clearly hear the voice of the outside interlocutor communicating with the user, specifically, the first sound signal can be played by the ear canal internal loudspeaker in the earphone.

It should be noted that after switching the earphone to auxiliary listening mode, the vibration signal in the user's ear canals are continued to be collected by the vibration sensor while the earphone is controlled to play the first sound signal in the ambient sound, and when it is determined that the user is not communicating with another person according to the vibration signal, specifically, when it can be determined that the user's voice energy value is less than the preset value for a certain period of time (20 seconds), at this point, the user has completed communication with external personnel in person, and therefore, the earphone can be switched into audio playing mode so that the earphone continues to play the audio file currently playing.

Specifically, the first sound signal in the embodiment of the present disclosure may include a human sound signal and/or an anthropomorphic sound signal.

Furthermore, if the voice parameter includes voice energy, the step of acquiring the corresponding voice parameter according to the vibration signal, and determining whether the user is communicating with another person according to the voice parameter includes:

acquiring the corresponding voice energy according to the vibration signal, and determining whether the value of the corresponding voice energy reaches a preset value according to the voice energy. If so, it is determined that the user is communicating with another person; if not, it is determined that the user is not communicating with another person.

Specifically, after acquiring voice energy according to vibration signal, if the voice energy value is greater than the preset value, it indicates that the user's voice is loud, and at this point, the user is communicating with another person; if the voice energy value does not reach the preset value, it indicates that the user's voice is low, and at this point, the user is not communication with another person.

Furthermore, in S130, the step of acquiring the corresponding voice energy according to the vibration signal, and determining whether the value of the corresponding voice energy reaches a preset value according to the voice energy may specifically include: performing noise elimination processing on the vibration signal to extract a first vibration signal corresponding to the user's voice;

performing voice energy detection on the first vibration signal to obtain the value of the corresponding voice energy, and determining whether the value of the corresponding voice energy reaches the preset value.

It should be noted that, in practical applications, the vibration signal caused by the user speaking includes the ear canal vibration signal caused by the user speaking and the ear canal vibration signal caused by ambient sound. Therefore, in order to obtain more accurate user's voice energy value, in this embodiment, the collected vibration signal is subjected to noise elimination processing, and the ambient sound in the vibration signal is taken as noise to be eliminated, wherein the ambient sound includes ambient noise and ambient human voice. Then, the first vibration signal corresponding to the user's voice is obtained, and energy detection is performed on the first vibration signal to obtain the voice energy value of the first vibration signal. Specifically, the value of the corresponding voice energy can be obtained based on the average peak value of the first vibration signal within a preset duration (5 ms), and then it is determined whether the voice energy value reaches the preset value, so as to further determine whether the user is communicating with external personnel in person to determine whether to switch the earphone to auxiliary listening mode. Furthermore, before performing voice energy detection on the first vibration signal to obtain the value of the corresponding voice energy, and determining whether the value of the corresponding voice energy reaches the preset value as above, the audio playing method may further include: transmitting the first vibration signal to a terminal device so as to recognize an identity of the user; and receiving a recognition result and proceed to the next step when the recognition result is verified.

Specifically, after obtaining the first vibration signal corresponding to the user's voice, in the embodiment of the present disclosure, the first vibration signal may also be transmitted to the terminal device so as to recognize the identity of the user. Specifically, the standard vibration signal corresponding to the user's sound signal can be stored in advance, and then the first vibration signal can be matched with the standard vibration signal. When the first vibration signal and the standard vibration signal are the same, user's identity recognition is verified, and when the first vibration signal and the standard vibration signal are different, it indicates that the person using the earphone is not the user himself. At this point, identity recognition fails, and the terminal device can return the recognition result to the earphone. The earphone further determines whether to perform voice energy detection on the first vibration signal according to the recognition result, and perform voice energy detection after the identity recognition is verified. For the TWS earphone, among others, the first vibration signal can be encoded by Bluetooth voice and then transmitted to the mobile terminal connected to the earphone by Bluetooth through Bluetooth protocol stack.

Furthermore, in S140, the step of collecting the ambient sound and playing a first sound signal in the ambient sound by the earphone may specifically include:

Collecting the ambient sound and performing noise elimination processing on the ambient sound to obtain the first sound signal in the ambient sound;

mixing the first sound signal with the audio signal currently playing to obtain a mixed sound signal, and playing the mixed sound signal by the earphone;

It should be noted that, in the auxiliary listening mode, users need to communicate with external personnel in person, and therefore, an ambient sound may be picked up through an ear canal external microphone, and noise elimination processing may be performed on the ambient sound, so as to extract the first sound signal in the ambient sound. In order to enable the user to hear the voice of the outside interlocutor while listening to the audio, in this embodiment, the extracted first sound signal can be mixed with the audio signal currently playing, and the mixed sound signal after mixing process can be played by the earphone, so that the earphone plays music signal containing external human voice.

For TWS earphones, among others, the encoded audio data is output according to the current audio file on the Bluetooth protocol stack, and the Bluetooth audio is decoded, so as to obtain PCM format audio data. The audio data is subjected to sound effect post-processing, so as to obtain rendered audio, and then, the rendered audio is mixed with the first sound signal extracted from the ambient sound. Specifically, the rendered audio and the first sound signal can be mixed in a certain proportion to obtain a mixed sound signal, wherein the specific proportion can be determined according to actual needs, and the present application does not set any characteristic limitations on this.

Furthermore, before mixing the first sound signal with the audio signal currently playing to obtain a mixed sound signal, audio playing method may further include: performing loudness compensation processing on the first sound signal to obtain the compensated sound signal;

picking up sound signal in the user's ear canal and extracting resonant sound signal from the sound signal in the user's ear canal; and processing the resonant sound signal to obtain a resonant sound suppression signal.

It should be noted that, the ear blockage effect of in-ear earphone is one of the main factors affecting the comfort of wearing an earphone. When the in-ear earphone is worn, the increase in mid frequency in the user's external ear canal resonance cavity will be weakened. The low-frequency resonance when user speaks not only causes serious distortion when the user listens to their own voice, but also causes distortion when he listens to the voice of the interlocutor, affecting the smoothness of conversation. Therefore, in this embodiment, in order to enable the user to hear the voice of his interlocutor more clearly, after extracting the first sound signal from the ambient sound, the first sound signal can be subjected to loudness compensation processing to obtain the compensated sound signal on the one hand, and the sound signal in the user's ear canal can be picked up through the microphone in the ear canal on the other hand, wherein the sound signal in the user's ear canal includes the sound signal played by the loudspeaker according to the first sound signal, as well as the generated resonance sound signal. Then, the resonance sound signal is extracted from the sound signal in the user's ear canal, and the resonance sound signal is subjected to suppression processing to obtain a resonance sound suppression signal. Here, specifically, it is possible to generate an equal amplitude and inverse phase sound signal corresponding to the resonant sound signal, and use this sound signal as the resonant sound suppression signal.

Correspondingly, the above step of mixing the first sound signal with the audio signal currently playing to obtain a mixed sound signal may specifically include:

mixing the compensated sound signal and the resonance sound suppression signal with the audio signal currently playing to obtain a mixed sound signal, to enable the user can hear his interlocutor's voice more clearly, so that the user can have a smooth conversation with his interlocutor.

It can be seen that this audio playing method can play the current audio file when the earphone is in audio playing mode, and collect the vibration signal in the user's ear canal through the vibration sensor provided on the earphone during the audio playing process, and then determine whether the user's voice energy value reaches the preset value according to the vibration signal. If it reaches the preset value, it indicates that the user needs to communicate with external personnel in person, and at this point, the earphone is switched to auxiliary listening mode, wherein the auxiliary listening mode is configured to collect ambient sound and then play, by the earphone, the first sound signal in the ambient sound, so that the user can hear the voice of external personnel and communicate with them. The present disclosure can provide convenience for users and improve the user's using experience.

Figure 2:
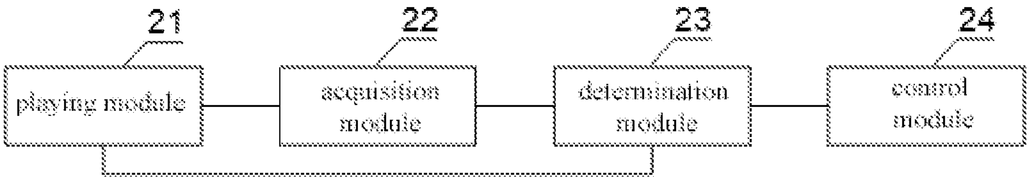
FIG. 2 is a schematic diagram of the structure of an audio playing apparatus for an in-ear earphone according to an embodiment of the present disclosure.

In addition to the above embodiments, the present disclosure also provides an audio playing apparatus for in-ear earphone, specifically, as shown in FIG. 2. The audio playing apparatus is applied to in-ear earphone provided with a vibration sensor, including:

a playing module 21 for controlling the earphone to perform audio playing according to the current audio file when the earphone is in an audio playing mode;

an acquisition module 22 for acquiring a vibration signal in user's ear canal by the vibration sensor during the audio playing;

a determination module 23 for acquiring a corresponding voice parameter according to the vibration signal, and determining whether the user is communicating with another person according to the voice parameter, if so, activating the control module; an if not, activating the playing module; and the control module 24 for switching the earphone to auxiliary listening mode, wherein the auxiliary listening mode is configured to collect ambient sound and play a first sound signal in the ambient sound by the earphone, wherein the first sound signal includes a sound signal of the person communicating with the user.

It should be noted that, the audio playing apparatus for in-ear earphone provided in the embodiments of the present disclosure has the same beneficial effect as the audio playing method for in-ear earphone provided in the above embodiments. The specific introduction of the audio playing method for in-ear earphone involved in the present embodiments may be referred to the above embodiments, and will not be duplicated herein.

Figure 3:
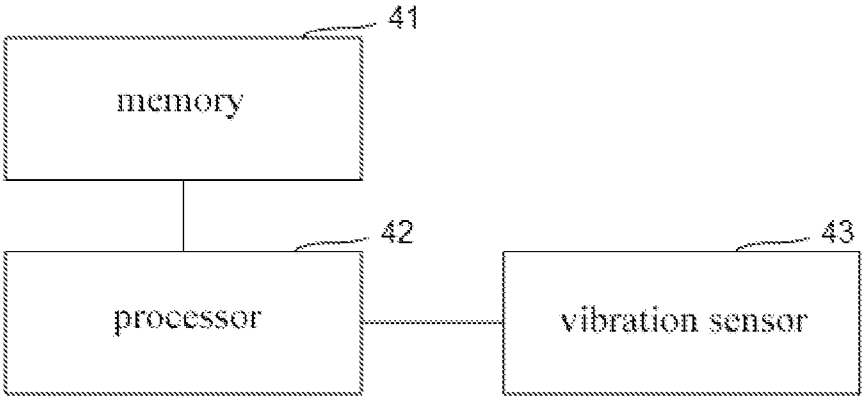
FIG. 3 is a schematic diagram of the structure of an audio playing system for an in-ear earphone according to an embodiment of the present disclosure.
Figure 4:
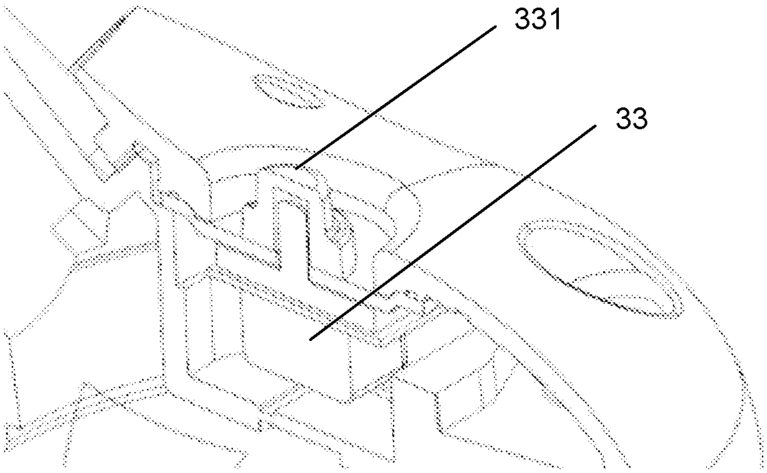
FIG. 4 is a schematic diagram of the internal structure of an in-ear earphone according to an embodiment of the present disclosure.

In addition to the above embodiments, the present disclosure also provides an audio playing system for in-ear earphone, as specifically shown in FIGS. 3 to 4. The audio playing system for in-ear earphone comprises a processor 31, a memory 32, and a vibration sensor 33 configured to collect vibration signal in the user's ear canal provided on the in-ear earphone, wherein, the memory 31 is configured to store a computer program;

the processor 32 is configured to implement the steps of the audio playing method for in-ear earphone as described above when executing the computer program.

Here, the vibration sensor 33 in this embodiment can be provided inside the sound chamber of the in-ear earphone, and the contact point 331 of the vibration sensor is provided at a position of the outer wall of the sound chamber abutting against the user's ear canal, as shown in FIG. 4.

It should be noted that, the processor in this embodiment can be specifically configured to control the earphone to perform audio playing according to the current audio file when the earphone is in audio playing mode, to acquire vibration signal in the user's ear canal by the vibration sensor during audio playing, to acquire corresponding voice parameter according to the vibration signal, and to determine whether the user is communicating with another person according to the voice parameter. If so, the earphone is switched to auxiliary listening mode, wherein the auxiliary listening mode is configured to collect environmental sound and play the first sound signal in the ambient sound by the earphone, wherein the first sound signal includes the sound signal of the person communicating with the user; and if not, the current audio playing mode is continued to be maintained.

In addition to the above embodiments, the present disclosure also provides a computer-readable storage medium, on which computer program are stored. The steps of audio playing method for in-ear earphone as described above is implemented when the computer program is executed by the processor.

The computer-readable storage medium may include various media that can store program codes, such as USB flash drives, removable hard drives, Read Only Memory (ROM), Random Access Memory (RAM), magnetic disks or optical discs.

The various embodiments in the present disclosure are described in a parallel or progressive manner, and each embodiment focuses on the differences from other embodiments. The same or similar parts between each embodiment may be referred to each other. As for the apparatus disclosed in the embodiments, the description is relatively simple since it corresponds to the method disclosed in the embodiment. The relevant information may refer to the description for method.

It should also be noted that herein, relational terms such as first and second are only used to distinguish one entity or operation from another entity or operation, and do not necessarily require or imply any actual relationship or order between these entities or operations. Moreover, the terms "comprise", "include" or any other variation thereof are intended to encompass non-exclusive inclusion, such that a process, method, object or device that comprises a series of elements not only comprises those elements, but also comprise other elements that are not explicitly listed, or also comprise elements inherent in such a process, method, object or device. Without further limitations, the elements limited by the statement "comprising one . . . " do not exclude the existence of other identical elements in the process, method, object or device that comprises the elements.

The above explanation of the disclosed embodiments enables those skilled in the art to implement or use the present disclosure. The various modifications to these embodiments will be apparent to those skilled in the art, and the general principles defined herein can be implemented in other embodiments without departing from the spirit or scope of the present disclosure. Therefore, the present disclosure will not be limited to the embodiments shown herein, but rather to the widest range consistent with the principles and novel features disclosed herein.

What is claimed is:

1. An audio playing method for in-ear earphone, which is applied to an in-ear earphone provided with a vibration sensor, comprising:

when the earphone is in an audio playing mode, controlling the earphone to perform audio playing according to a current audio file;

acquiring a vibration signal in user's ear canal by the vibration sensor during the audio playing; and acquiring a corresponding voice parameter according to the vibration signal, and determining whether the user is communicating with another person according to the voice parameter; if so, switching the earphone to an auxiliary listening mode, wherein the auxiliary listening mode is configured to collect ambient sound and play, by the earphone, a first sound signal in the ambient sound, wherein the first sound signal comprises a sound signal of the person communicating with the user; and if not, continuing maintaining the current audio playing mode, wherein collecting ambient sound and playing, by the earphone, the first sound signal in the ambient sound comprises:

collecting ambient sound and performing noise elimination processing on the ambient sound to obtain the sound signal in the ambient sound;

mixing the first sound signal with the audio signal currently playing to obtain a mixed sound signal, and playing the mixed sound signal by the earphone, wherein, before mixing the first sound signal with the audio signal currently playing to obtain the mixed sound signal, the audio playing method further comprises:

performing loudness compensation processing on the first sound signal to obtain a compensated sound signal;

picking up a sound signal in the user's ear canal and extracting a resonant sound signal from the sound signal in the user's ear canal; and processing the resonant sound signal to obtain a resonant sound suppression signal; and wherein mixing the first sound signal with the audio signal currently playing to obtain the nixed sound signal comprises:

mixing the compensated sound signal and the resonance sound suppression signal with the audio signal currently playing to obtain the mixed sound signal.

2. The audio playing method for in-ear earphone of claim 1, wherein, if the voice parameter comprises voice energy, acquiring the corresponding voice parameter according to the vibration signal, and determining whether the user is communicating with the another person according to the voice parameter comprises:

acquiring a corresponding voice energy according to the vibration signal, and determining whether a value of the corresponding voice energy reaches a preset value according to the voice energy; if so, determining that the user is communicating with another person; if not, determining that the user is not communicating with another person.

3. The audio playing method for in-ear earphone of claim 2, wherein acquiring the corresponding voice energy according to the vibration signal, and determining whether the value of the corresponding voice energy reaches the preset value according to the voice energy comprises:

performing noise elimination processing on the vibration signal to extract a first vibration signal corresponding to the user's voice;

performing voice energy detection on the first vibration signal to obtain the value of the corresponding voice energy, and determining whether the value of the corresponding voice energy reaches the preset value.

4. The audio playing method for in-ear earphone of claim 3, wherein, before performing voice energy detection on the first vibration signal to obtain the value of the corresponding voice energy, and determining whether the value of the corresponding voice energy reaches the preset value, the audio playing method further comprises:

transmitting the first vibration signal to a terminal device so as to recognize an identity of the user; and receiving a recognition result and proceed to the next step when the recognition result is verified.

5. The audio playing method for in-ear earphone of claim 1, wherein the first sound signal comprises a human sound signal and/or an anthropomorphic sound signal.

6. The audio playing method for in-ear earphone of claim 1, wherein, after switching the earphone to the auxiliary listening mode, the audio playing method further comprises:

continuing to collect a vibration signal in the user's ear canal by the vibration sensor, and when it is determined that the user is not communicating with another person according to the vibration signal, switching the earphone to the audio playing mode so that the earphone continues playing the audio file currently playing.

7. An audio playing system for in-ear earphone, comprising a processor, a memory, and a vibration sensor configured to collect a vibration signal in user's ear canal provided on the in-ear earphone, wherein, the memory is configured to storing a computer program; and the processor is configured to implement steps of the audio playing method for in-ear earphone according to claim 1 when executing the computer program.

* * * * *